United States Patent
Palanki et al.

(10) Patent No.: US 9,854,590 B2
(45) Date of Patent: Dec. 26, 2017

(54) MULTI-CARRIER OPERATION IN A WIRELESS COMMUNICATION NETWORK

(71) Applicant: QUALCOMM Incorporated, San Diego, CA (US)

(72) Inventors: Ravi Palanki, San Diego, CA (US); Alexei Y. Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 14/313,780

(22) Filed: Jun. 24, 2014

(65) Prior Publication Data

US 2015/0023259 A1    Jan. 22, 2015

Related U.S. Application Data

(62) Division of application No. 12/490,086, filed on Jun. 23, 2009, now Pat. No. 8,761,824.
(Continued)

(51) Int. Cl.
H04W 4/00 (2009.01)
H04W 72/08 (2009.01)
(Continued)

(52) U.S. Cl.
CPC .......... *H04W 72/082* (2013.01); *H04L 5/003* (2013.01); *H04L 5/0007* (2013.01);
(Continued)

(58) Field of Classification Search
CPC ............................ H04W 72/082; H04W 24/02
(Continued)

(56) References Cited

U.S. PATENT DOCUMENTS

| 5,513,379 A | 4/1996 | Benveniste et al. |
| 6,327,468 B1 | 12/2001 | Van et al. |

(Continued)

FOREIGN PATENT DOCUMENTS

| CA | 2300067 A1 | 2/1999 |
| CN | 1510948 A | 7/2004 |

(Continued)

OTHER PUBLICATIONS

3rd Generation Partnership Project; "Technical Specification Group Radio Access Network"; Evolved UTRA and UTRAN; Radio Access Architecture and Interfaces (Release 7), 3GPP TR R.018 V1.0.0 (Oct. 2007), R3-07207, pp. 1-137.
(Continued)

*Primary Examiner* — Ricky Ngo
*Assistant Examiner* — Wei-Po Kao
(74) *Attorney, Agent, or Firm* — Norton Rose Fulbright US LLP

(57) ABSTRACT

Techniques for communicating on multiple carriers in a wireless communication network are described. In an aspect, different transmit power levels may be used for different carriers to mitigate interference. A first base station may be assigned one or more carriers among multiple carriers available for communication. A second base station may be assigned one or more carriers not assigned to the first base station. Each base station may communicate on each assigned carrier at a first (e.g., full) transmit power level and may communicate on each unassigned carrier at a second (e.g., lower) transmit power level lower. The first and second base stations may belong in different power classes or support different association types. In another aspect, control information may be sent on a designated carrier to support communication on multiple carriers. In yet another aspect, a base station may broadcast bar information indicating the status of carriers.

45 Claims, 8 Drawing Sheets

Related U.S. Application Data

(60) Provisional application No. 61/076,366, filed on Jun. 27, 2008.

(51) Int. Cl.
  *H04L 5/00* (2006.01)
  *H04L 27/26* (2006.01)
  *H04W 52/24* (2009.01)
  *H04W 24/02* (2009.01)

(52) U.S. Cl.
  CPC ........ *H04L 5/0073* (2013.01); *H04L 27/2601* (2013.01); *H04W 24/02* (2013.01); *H04W 52/244* (2013.01)

(58) Field of Classification Search
  USPC .................................. 370/310–350, 431–463
  See application file for complete search history.

(56) References Cited

U.S. PATENT DOCUMENTS

| | | |
|---|---|---|
| 7,047,016 B2 | 5/2006 | Walton et al. |
| 7,058,030 B2 | 6/2006 | Ekl et al. |
| 7,180,877 B1 | 2/2007 | Benveniste |
| 7,349,504 B2 | 3/2008 | Li et al. |
| 8,139,531 B2 | 3/2012 | Li et al. |
| 8,181,079 B2 | 5/2012 | Gorokhov et al. |
| 8,594,576 B2 | 11/2013 | Palanki |
| 8,761,824 B2 | 6/2014 | Palanki et al. |
| 2003/0128679 A1 | 7/2003 | Ishiguro et al. |
| 2004/0106412 A1 | 6/2004 | Laroia et al. |
| 2004/0176124 A1 | 9/2004 | Gopalakrishnan et al. |
| 2006/0035641 A1 | 2/2006 | Moon et al. |
| 2006/0193338 A1* | 8/2006 | Zheng ................... H04L 5/0046 370/437 |
| 2006/0203724 A1 | 9/2006 | Ghosh et al. |
| 2006/0209721 A1 | 9/2006 | Mese et al. |
| 2006/0221883 A1* | 10/2006 | Damnjanovic .......... H04J 11/00 370/315 |
| 2006/0250935 A1* | 11/2006 | Hamamoto ........... H04L 5/0032 370/203 |
| 2006/0280142 A1 | 12/2006 | Damnjanovic et al. |
| 2007/0060057 A1 | 3/2007 | Matsuo et al. |
| 2007/0070908 A1* | 3/2007 | Ghosh ................... H04L 5/0007 370/236 |
| 2007/0082619 A1 | 4/2007 | Zhang et al. |
| 2007/0105574 A1 | 5/2007 | Gupta et al. |
| 2007/0142067 A1 | 6/2007 | Cheng et al. |
| 2007/0178928 A1* | 8/2007 | Ode ....................... H04L 1/0006 455/522 |
| 2007/0207828 A1 | 9/2007 | Cheng et al. |
| 2007/0223611 A1 | 9/2007 | Ode et al. |
| 2007/0242765 A1 | 10/2007 | Parizhisky et al. |
| 2007/0248052 A1 | 10/2007 | Nagaraj et al. |
| 2008/0008147 A1 | 1/2008 | Nakayama |
| 2008/0070586 A1* | 3/2008 | Kermoal ................. H04L 5/003 455/452.2 |
| 2008/0119155 A1 | 5/2008 | Bobier |
| 2008/0233967 A1 | 9/2008 | Montojo et al. |
| 2009/0104908 A1 | 4/2009 | Matsumoto et al. |
| 2009/0130980 A1 | 5/2009 | Palanki et al. |
| 2009/0203320 A1 | 8/2009 | Horn et al. |
| 2009/0227263 A1 | 9/2009 | Agrawal et al. |
| 2009/0247181 A1 | 10/2009 | Palanki et al. |
| 2011/0044222 A1* | 2/2011 | Gerstenberger ...... H04L 5/0016 370/311 |
| 2011/0081940 A1* | 4/2011 | Gerstenberger ...... H04L 5/0053 455/522 |

FOREIGN PATENT DOCUMENTS

| | | |
|---|---|---|
| CN | 1551525 A | 12/2004 |
| CN | 1989775 A | 6/2007 |
| EP | 0901299 A2 | 3/1999 |
| EP | 1455549 A1 | 9/2004 |
| EP | 1850612 A1 | 10/2007 |
| JP | 2001516166 A | 9/2001 |
| JP | 2003198502 A | 7/2003 |
| JP | 2004214754 A | 7/2004 |
| JP | 2005328519 A | 11/2005 |
| JP | 2006121641 A | 5/2006 |
| JP | 2006287601 A | 10/2006 |
| JP | 2007023787 A | 2/2007 |
| JP | 2007529915 A | 10/2007 |
| JP | 2007533224 A | 11/2007 |
| JP | 2008017325 A | 1/2008 |
| JP | 2011502093 A | 1/2011 |
| KR | 20060129219 A | 12/2006 |
| KR | 20070058683 A | 6/2007 |
| RU | 2142669 C1 | 12/1999 |
| WO | WO-9428623 A1 | 12/1994 |
| WO | WO-9909667 A1 | 2/1999 |
| WO | WO-9909669 A1 | 2/1999 |
| WO | WO-02093782 A1 | 11/2002 |
| WO | WO-03021903 A1 | 3/2003 |
| WO | WO-2005062798 A2 | 7/2005 |
| WO | WO-2005101882 A1 | 10/2005 |
| WO | WO-2006046307 A1 | 5/2006 |
| WO | WO-2006096789 A1 | 9/2006 |
| WO | WO-2006099547 A1 | 9/2006 |
| WO | WO-2006105308 A2 | 10/2006 |
| WO | WO-2006126616 A1 | 11/2006 |
| WO | WO-2007020958 A1 | 2/2007 |
| WO | WO-2007022631 A1 | 3/2007 |
| WO | WO-2007024895 A2 | 3/2007 |
| WO | WO-2007044281 A1 | 4/2007 |
| WO | WO-2008030823 A1 | 3/2008 |
| WO | WO-2008093100 A2 | 8/2008 |
| WO | WO-2009009549 A2 | 1/2009 |
| WO | WO-2009035983 A1 | 3/2009 |
| WO | WO-2009039404 | 3/2009 |
| WO | WO-2009043002 | 4/2009 |
| WO | WO-2009064699 A1 | 5/2009 |

OTHER PUBLICATIONS

"3rd Generation Partnership Project;Technical Specification Group Radio Access Network; Evolved UTRA and UTRAN;Radio Access Architecture and Interfaces (Release 7)" 3GPP Draft; TR_R3018_V_100, 3rd Generation Partnership Project (3GPP), Mobile Competence Centre ; 650, Route Des Lucioles ; F-06921 Sophia-Antipolis Cedex ; France, vol. RAN WG3, Oct. 12, 2007 (Oct. 12, 2007), XP050143278 paragraph [6.12.5.1]—paragraph [6.12.5.3.5] figures 6.12.5.3.5.1.

Ericsson et al., "Text Proposal for DC-HSDPA assumptions and standards impact", 3GPP Draft; R1-082249 Text Proposal for DC-HSDPA Assumptions and Standards Impact, 3rd Generation Partnership Project (3GPP), Mobile Competence Centre; 650 Route Des Lucioles; F-06921 Sophia-Antipolis Cedex; France, vol. RAN WGl no. Kansas City, USA; May 23, 2008, May 23, 2008 (May 23, 2008), 18 Pages, XP050110541, p. 8, paragraph 4.1-paragraph 4.2; p. 9, paragraph 4.3.1.

Huawei: "Component carrier structures", 3GPP Draft; R1-090814, 3rd Generation Partnership Project (3GPP), Mobile Competence Centre ; 650, Route Des Lucioles ; F-06921 Sophia-Antipolis Cedex ; France, no. Athens, Greece; Feb. 3, 2009, Feb. 3, 2009 (Feb. 3, 2009), XP050318671, [retrieved on Feb. 3, 2009].

International Search Report and Written Opinion—PCT/US2009/048725, International Search Authority—European Patent Office—Nov. 2, 2009.

Nokia et al., "L1 control signaling with carrier aggregation in LTE-Advanced", 3GPP Draft; R1-083730, 3rd Generation Partnership Project (3GPP), Mobile Competence, Mobile Competence Centre; 650, Route Des Lucioles; F-06921 Sophia-Antipolis Cedex; France, no. Prague, Czech Republic; Sep. 24, 2008, Sep. 24, 2008 (Sep. 24, 2008), 7 pages, XP050317069, [retrieved on Sep. 24, 2009].

Nokia Siemens Networks et al., "Primary Component Carrier Selection, Monitoring, and Recovery" 3GPP Draft; R1-090735_

(56) References Cited

OTHER PUBLICATIONS

PrimaryCCSelect, 3rd Generation Partnership Project (3GPP), Mobile Competence Centre; 650, Route Des Lucioles; F-06921 Sophia-Antipolis Cedex; France, no. Athens, Greece, Feb. 3, 2009, Feb. 3, 2009 (Feb. 3, 2009), XP050318599.
Nokia Siemens Networks et al., "Use of Background Interference Matrix for Autonomous Component Carrier Selection for LTE-Advanced" 3GPP Draft; R1-090235, 3rd Generation Partnership Project (3GPP), Mobile Competence Centre ; 650, Route Des Lucioles ; France no. Ljubljana Jan. 7, 2009, Jan. 7, 2009 (Jan. 7, 2009), XP050318164 [retrieved on Jan. 7, 2009] the whole document.
Samsung: "Flexible Fractional Frequency—Reuse Approach" R1-051341, Internet Citation Nov. 7, 2005 (Nov. 7, 2005), XP002387571 Retrieved from the Internet: URL:http://www.3gpp.org/ftp/tsgran/WGURL I/TSGRI_43/Docs/> [retrieved on Jun. 2006—273H: the whole document.
Taiwan Search Report—TW098121710—TIPO—Nov. 20, 2012.
Taiwan Search Report—TW098121710—TIPO—Aug. 16, 2013.
Qualcomm Europe: "HNB and Macro Downlink Performance with Calibrated HNB Transmit Power" 3GPP Draft; R4-081344, 3RD Generation Partnership Project (3GPP), Mobile Competence Centre; 650, Route Des Lucioles; F-06921 Sophia-Antipolis Cedex; France, vol. RAN WG4, No. Munich, Germany; Jun. 10, 2008, (Jun. 10, 2008), XP050179935 [retrieved on Jun. 10, 2008] paragraphs [0001], [0004], [0009].

\* cited by examiner

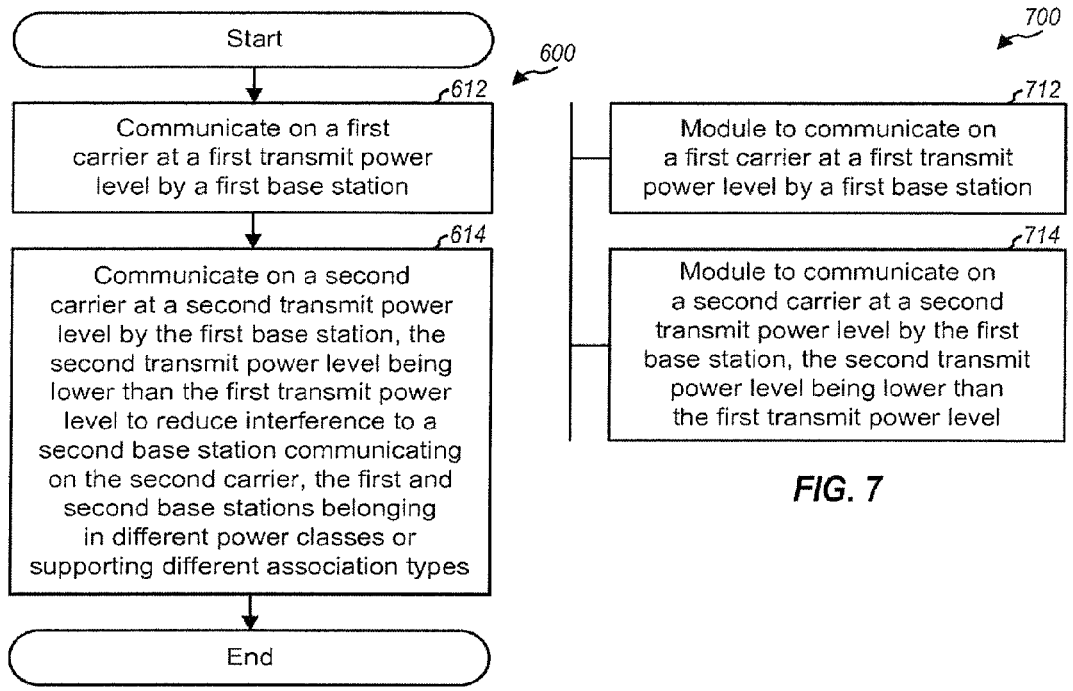
FIG. 6
FIG. 7
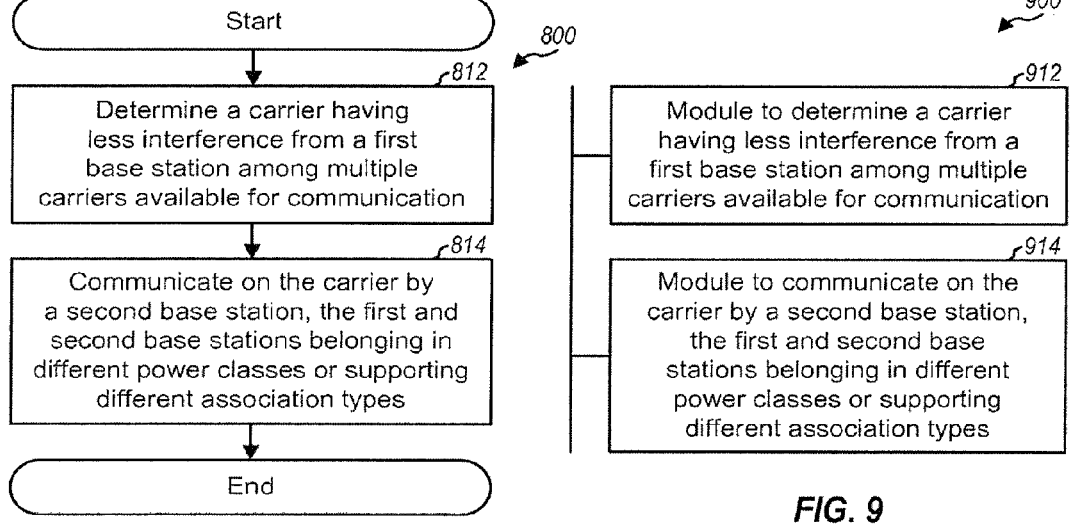
FIG. 8
FIG. 9

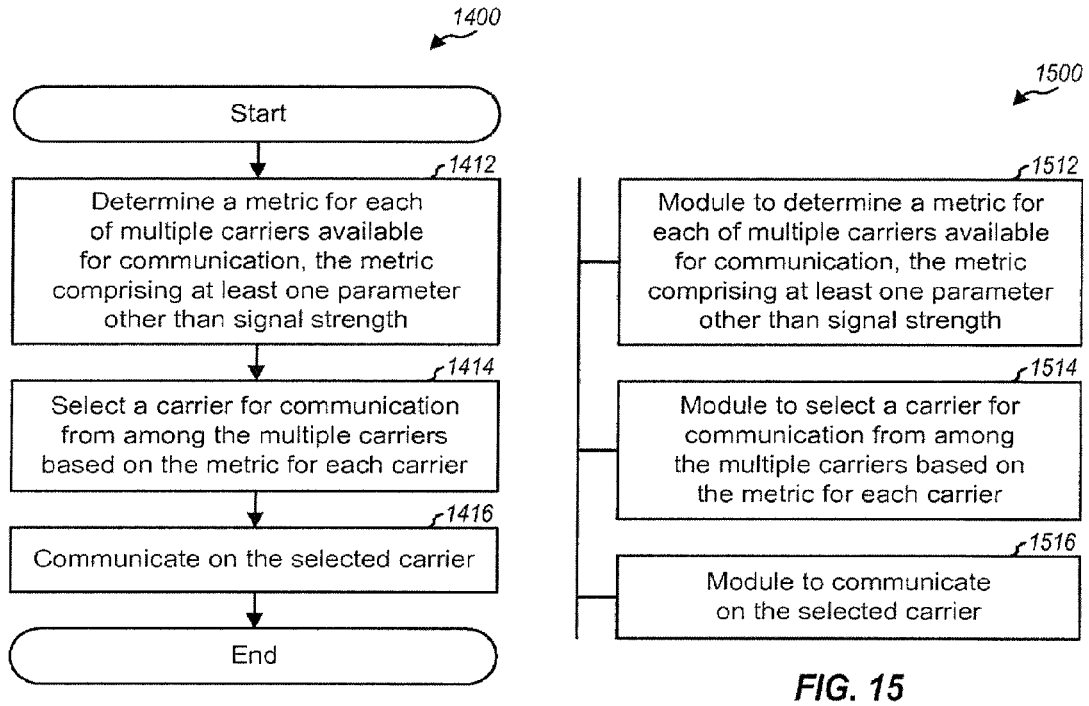
FIG. 14
FIG. 15
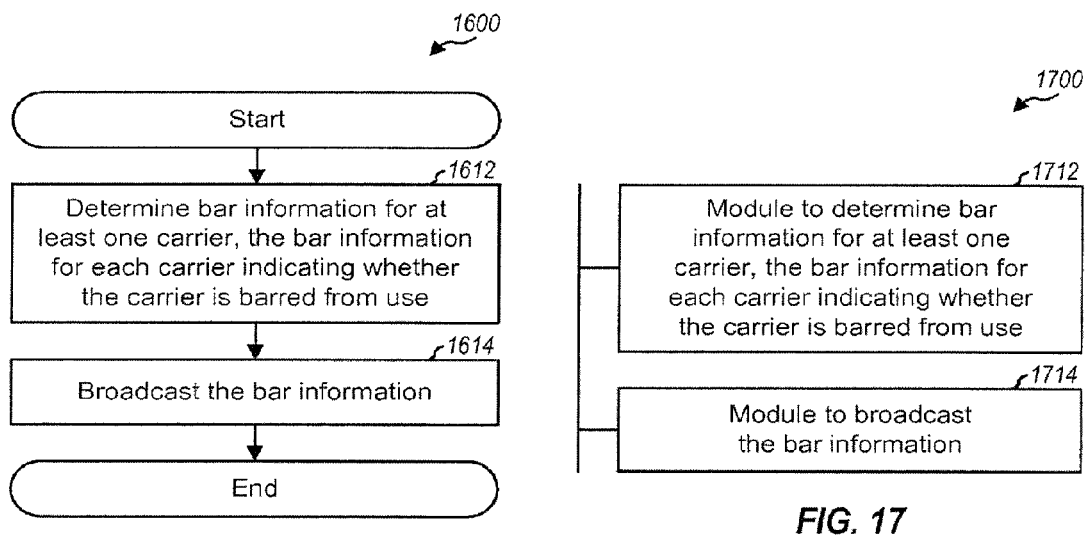
FIG. 16
FIG. 17

MULTI-CARRIER OPERATION IN A WIRELESS COMMUNICATION NETWORK

The present application for patent is a divisional of commonly assigned, U.S. patent application Ser. No. 12/490,086 filed Jun. 23, 2009, which claims priority to provisional U.S. application Ser. No. 61/076,366, entitled "FLEXIBLE MULTICARRIER COMMUNICATION SYSTEM," filed Jun. 27, 2008, assigned to the assignee hereof and incorporated herein by reference.

BACKGROUND

I. Field

The present disclosure relates generally to communication, and more specifically to techniques for communicating in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may observe interference due to transmissions from other UEs communicating with the neighbor base stations. The interference may degrade performance on both the downlink and uplink.

SUMMARY

Techniques for communicating on multiple carriers in a wireless communication network are described herein. A carrier may be a range of frequencies that may be used for communication and may be defined by a particular center frequency and a particular bandwidth. A carrier may be separated from an adjacent carrier by a guard band and may also have other attributes, as described below. The multiple carriers may be used to support communication in dominant interference scenarios, which are scenarios in which high interference may be observed from interfering base stations and/or interfering UEs.

In an aspect, different transmit power levels may be used for different carriers to mitigate interference and achieve good overall performance. In one design, a first base station may be assigned one or more carriers among multiple carriers available for communication. A second base station may be assigned one or more carriers not assigned to the first base station. The first base station may communicate on each assigned carrier at a first (e.g., full) transmit power level. The first base station may communicate on each unassigned carrier at a second transmit power level, which may be lower than the first transmit power level in order to reduce interference to the second base station. The first and second base stations may belong in different power classes. For example, the first base station may be a high-power base station whereas the second base station may be a lower-power base station, or vice versa. The first and second base stations may also support different association/access types. For example, the first base station may support unrestricted access whereas the second base station may support restricted access, or vice versa. Communication on the multiple carriers may be supported as described below.

In another aspect, control information may be sent on a designated carrier to support communication on at least one other carrier. A station (e.g., a base station or a UE) may communicate on the at least one carrier. The station may exchange (e.g., send or receive) control information on the designated carrier for the communication on the at least one carrier. The control information may comprise scheduling grants or assignments, channel quality indicator (CQI) information, acknowledgement (ACK) information, etc. The control information may be sent with a higher transmit power level on the designated carrier, which may improve reliability.

In yet another aspect, auto-configuration may be performed to select a suitable carrier for communication. A station (e.g., a base station or a UE) may determine a metric for each of multiple carriers available for communication. The metric may comprise at least one parameter other than signal strength, e.g., received signal quality, pathloss, etc. The station may select a carrier for communication from among the multiple carriers based on the metric for each carrier. The station may then communicate on the selected carrier. In one design, both data and control information may be exchanged (e.g., sent or received) via the selected carrier. In another design, control information may be exchanged via the selected carrier, and data may be exchanged via the selected carrier and/or another carrier.

In yet another aspect, a base station may broadcast bar information indicating the status of carriers. The base station may determine bar information for each carrier. In one design, the bar information for each carrier may indicate whether that the carrier is barred from use. In another design, the bar information for a given carrier may indicate that the carrier is not barred for a first set of UEs and is barred for a second set of UEs. The bar information for each carrier may also comprise other information that may be used to control access and communication on the carrier. The base station may broadcast the bar information to UEs, which may use the bar information to determine access to the base station.

Various aspects and features of the disclosure are described in further detail below.

BRIEF DESCRIPTION OF THE DRAWINGS

FIGS. 6 and 7 show a process and an apparatus, respectively, for communication on multiple carriers by a base station.

FIGS. 8 and 9 show a process and an apparatus, respectively, for communication on an assigned carrier by a base station.

FIGS. 14 and 15 show a process and an apparatus, respectively, for communication on a carrier selected with auto-configuration.

FIGS. 16 and 17 show a process and an apparatus, respectively, for broadcasting bar information by a base station.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
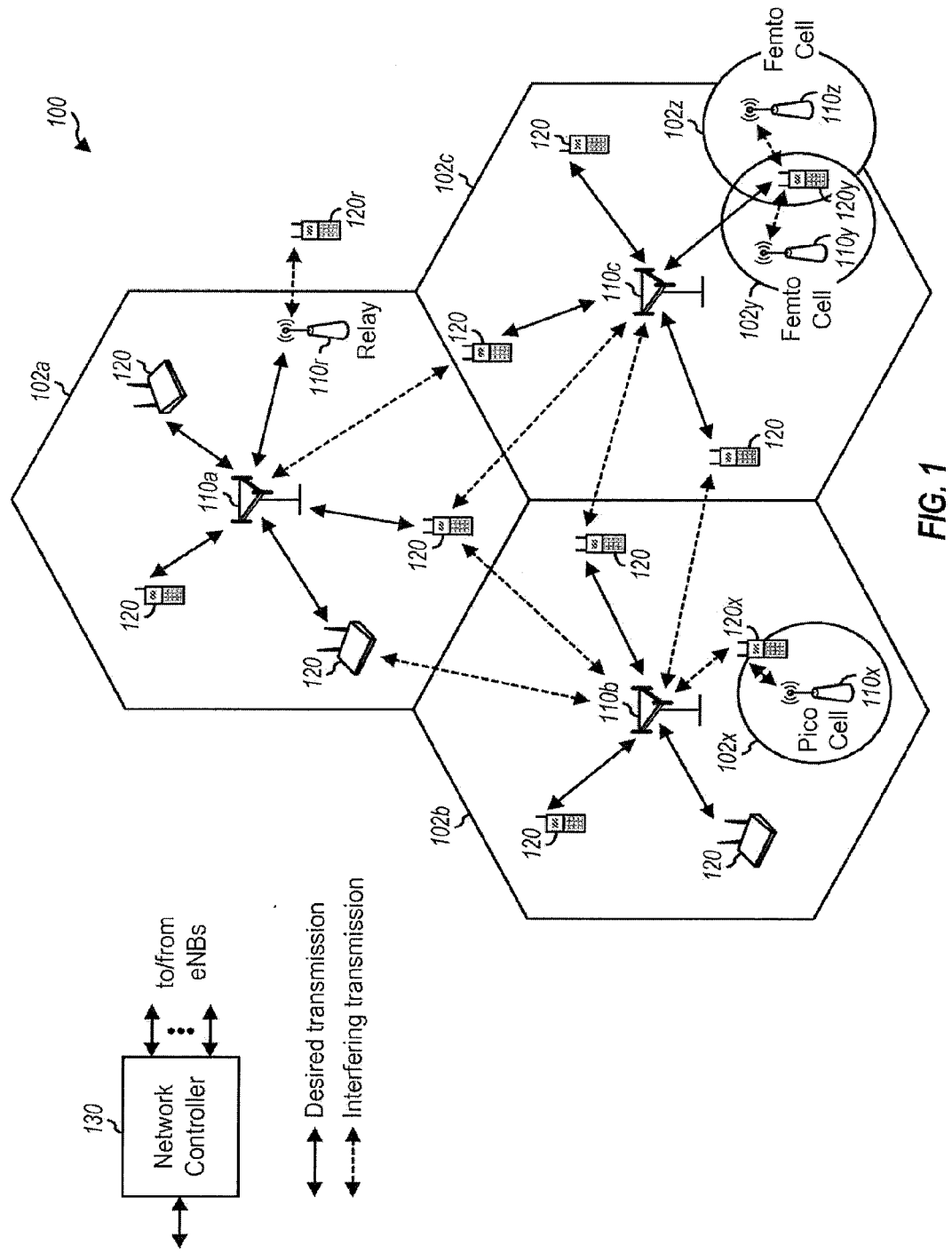
FIG. 1 shows a wireless communication network.

FIG. 1 shows a wireless communication network 100, which may be an LTE network or some other network. Wireless network 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b and 110c may be macro eNBs for macro cells 102a, 102b and 102c, respectively. eNB 110x may be a pico eNB for a pico cell 102x. eNBs 110y and 110z may be femto eNBs or home eNBs for femto cells 102y and 102z, respectively. An eNB may support one or multiple (e.g., three) cells.

Wireless network 100 may also include relay stations, e.g., a relay station 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. A relay station may also be referred to as a relay eNB, a relay, etc.

Wireless network 100 may be a homogeneous network that includes eNBs of one type, e.g., only macro eNBs, or only femto eNBs. Wireless network 100 may also be a heterogeneous network that includes eNBs of different types, e.g., macro eNBs, pico eNBs, femto eNBs, relays, etc. The different types of eNBs may have different transmit power levels, different coverage areas, and different impact on interference in wireless network 100. For example, macro eNBs may have a high transmit power level (e.g., 20 Watts) whereas pico eNBs, femto eNBs, and relays may have a lower transmit power level (e.g., 1 Watt). The techniques described herein may be used for both homogeneous and heterogeneous networks. The techniques may be used for different types of eNBs and relays.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and may provide coordination and control for these eNBs. Network controller 130 may communicate with eNBs 110 via a backhaul. eNBs 110 may also communicate with one another, e.g., via wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

Wireless network 100 may support operation on a configurable system bandwidth. For example, wireless network 100 may be an LTE network that supports operation on system bandwidth of 1.25, 2.5, 5, 10 or 20 megahertz (MHz). The system bandwidth may be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
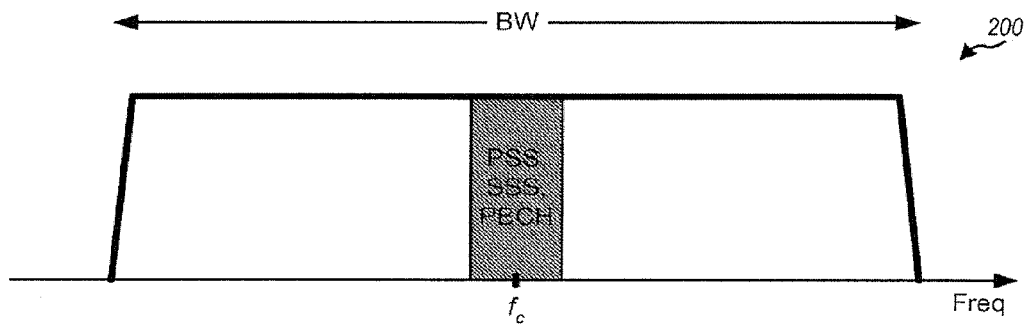
FIG. 2 shows a carrier structure for a single carrier.

FIG. 2 shows a design of a carrier structure 200 supporting communication on a single downlink carrier. The downlink carrier may have a bandwidth of BW and may be centered at a frequency of $f_c$. An eNB may transmit a primary synchronization signal (PSS) and a secondary synchronization signal (SSS) for each cell in the eNB. The synchronization signals may be used by UEs for cell detection and acquisition. The eNB may also transmit various control channels such as a Physical Broadcast Channel (PBCH), a Physical Control Format Indicator Channel (PCFICH), a Physical HARQ Indicator Channel (PHICH) and a Physical Downlink Control Channel (PDCCH) in LTE. The PBCH may carry certain system information. The PCFICH may convey the number of symbol periods (M) used for the control channels in a subframe. The PHICH may carry ACK information to support hybrid automatic retransmission (HARQ). The PDCCH may carry control information such as scheduling grants for UEs for data transmission on the downlink and uplink. The eNB may also transmit one or more data channels such as a Physical Downlink Shared Channel (PDSCH) in LTE. The PDSCH may carry data for UEs scheduled for data transmission on the downlink. The eNB may transmit the PSS, SSS and PBCH in the center 1.08 MHz of the downlink carrier. The eNB may transmit the PCFICH, PHICH, PDCCH and PDSCH across all or part of the downlink carrier in each symbol period in which these channels are sent.

A UE may be within the coverage of multiple eNBs. One of these eNBs may be selected to serve the UE. The serving eNB may be selected based on various criteria such as received signal quality, pathloss, etc. Received signal quality may be given by a signal-to-noise ratio (SNR), a carrier-to-interference ratio (C/I), etc.

A UE may operate in a dominant interference scenario, which is a scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x. Range extension may also be used for relays.

In an aspect, communication in dominant interference scenarios may be supported by using multiple carriers and assigning eNBs to different carriers such that good performance can be achieved. In general, any number of carriers may be used for each of the downlink and uplink. The number of carriers may be dependent on various factors such as the system bandwidth, the desired or required bandwidth for each carrier, etc. The available carriers may be assigned to the eNBs in various manners, as described below.

Figure 3A:
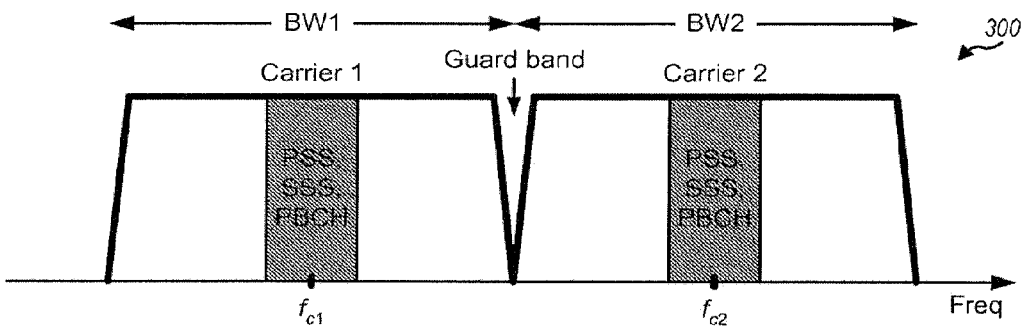
FIGS. 3A and 3B show carrier structures for multiple carriers.

FIG. 3A shows a design of a carrier structure 300 supporting communication on two downlink carriers 1 and 2. The system bandwidth of BW may be partitioned into two carriers, and each downlink carrier may have a bandwidth of BW/2. For example, a 10 MHz system bandwidth may be partitioned into two 5 MHz carriers. In general, the system bandwidth may be partitioned equally or unequally, and the downlink carriers may have the same or different bandwidths.

In one design, the two downlink carriers may be assigned to eNBs of different power classes. High-power eNBs (e.g., macro eNBs) may be assigned one downlink carrier (e.g., carrier 1), and lower-power eNBs (e.g., pico and femto eNBs) may be assigned the other downlink carrier (e.g., carrier 2). In another design, the two downlink carriers may be assigned to eNBs of different association/access types. Unrestricted eNBs (e.g., macro and pico eNBs) may be assigned one downlink carrier (e.g., carrier 1), and restricted eNBs (e.g., femto eNBs) may be assigned the other downlink carrier (e.g., carrier 2). The two carriers may also be assigned to eNBs in other manners.

Figure 3B:
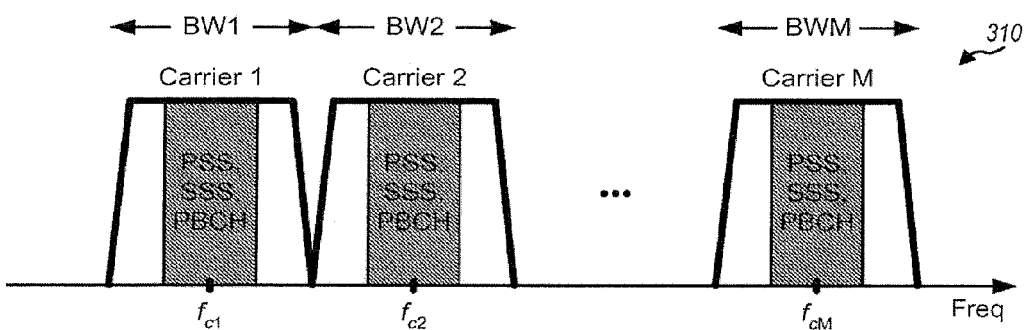

FIG. 3B shows a design of a carrier structure 310 supporting communication on M downlink carriers 1 through M, where M may be greater than two. The system bandwidth of BW may be partitioned into M equal parts, and each downlink carrier may have a bandwidth of BW/M. For example, a 10 MHz system bandwidth may be partitioned into four 2.5 MHz carriers. In general, the system bandwidth may be partitioned equally or unequally into M parts. The M downlink carriers may have the same or different bandwidths. For example, a 10 MHz system bandwidth may be partitioned into (i) four 2.5 MHz carriers, (ii) one 5 MHz carrier and two 2.5 MHz carriers, (iii) eight 1.25 MHz carriers, (iv) one 5 MHz carrier, one 2.5 MHz carrier, and two 1.25 MHz carriers, or (v) some other combination of carriers.

The M downlink carriers may be assigned to eNBs in various manners. In one design, eNBs of different power classes may be assigned different downlink carriers. In another design, eNBs of different association types may be assigned different downlink carriers. In yet another design, eNBs causing high interference to one another may be assigned different downlink carriers. For example, the 10 MHz system bandwidth may be partitioned into one 5 MHz carrier and two 2.5 MHz carriers. In the example shown in FIG. 1, macro eNB 110c may be assigned the 5 MHz carrier, femto eNB 110y may be assigned one 2.5 MHz carrier, and femto eNB 110z may be assigned the other 2.5 MHz carrier.

In general, an eNB may be assigned one or more downlink carriers. In one design, the eNB may transmit at full power on each assigned downlink carrier. In one design, the eNB may avoid transmitting on each unassigned downlink carrier or may transmit at a lower power level in order to reduce interference to other eNBs assigned this carrier. The eNB may thus transmit at different power levels on the assigned and unassigned downlink carriers. In general, higher transmit power may be used for an assigned carrier, and lower (or no) transmit power may be used for an unassigned carrier. For each eNB, an assigned carrier may have less interference from other eNBs than an unassigned carrier.

Figure 4:
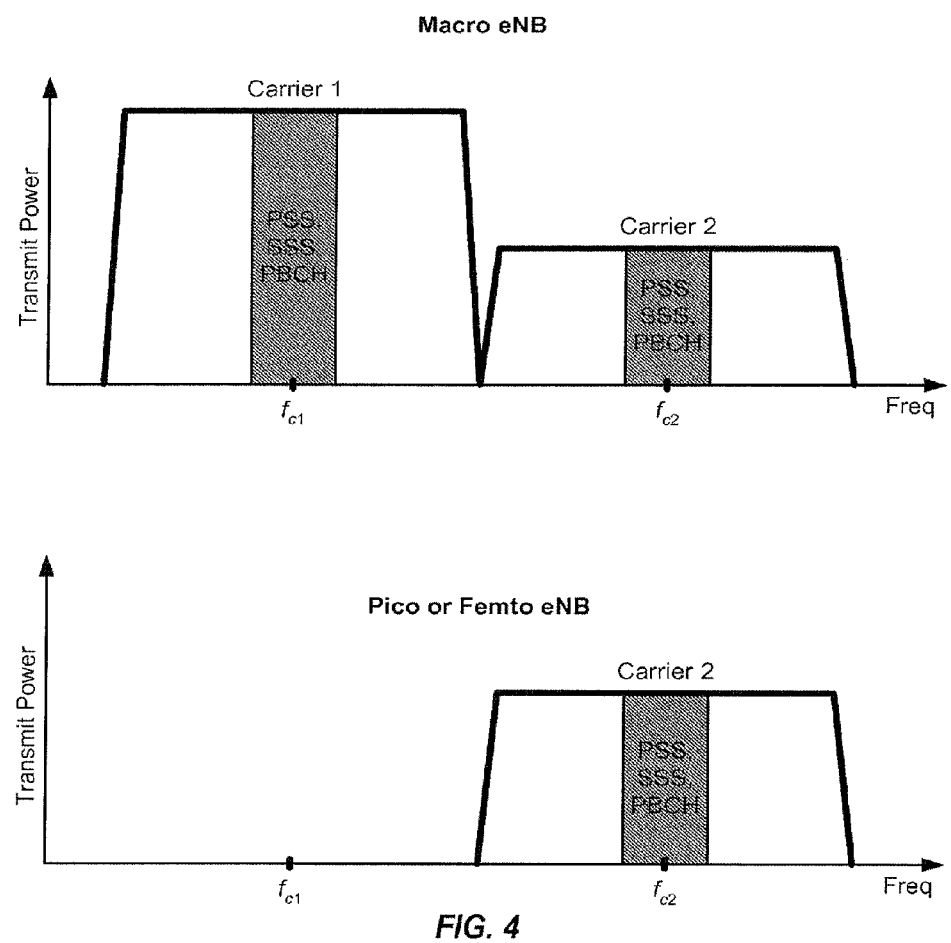
FIG. 4 shows operation on two carriers by a macro base station and operation on one of two carriers by a pico or femto base station.

FIG. 4 shows exemplary operation by a macro eNB on two downlink carriers 1 and 2. The horizontal axis may represent frequency, and the vertical axis may represent transmit power. The macro eNB may be assigned downlink carrier 1 and may transmit at full power on this carrier. The macro eNB may transmit at a lower power level on downlink carrier 2 (as shown in FIG. 4) or may avoid transmitting on carrier 2 (not shown in FIG. 4) in order to reduce interference to other eNBs assigned carrier 2.

FIG. 4 also shows exemplary operation by a pico or femto eNB for the example in which two downlink carriers 1 and 2 are available. The pico or femto eNB may be assigned downlink carrier 2 and may transmit at full power on this carrier. The pico or femto eNB may avoid transmitting on downlink carrier 1 (as shown in FIG. 4) or may transmit at a lower power level on carrier 1 (not shown in FIG. 4) in order to reduce interference to the macro eNB assigned carrier 1.

The design shown in FIG. 4 may support communication in a restricted association scenario, with a femto eNB being assigned downlink carrier 2. A UE that is within the range of the femto eNB may connect to the macro eNB on downlink carrier 1 and can avoid high interference from the femto eNB on downlink carrier 2. The design shown in FIG. 4 may also support communication in a range extension scenario, with a pico eNB being assigned downlink carrier 2. A UE that is within the range of the pico eNB may connect to the pico eNB on downlink carrier 2 and can avoid high interference from the macro eNB on downlink carrier 1.

In one design, the available downlink carriers may be assigned to eNBs in a dynamic and flexible manner. The available downlink carriers may be assigned to eNBs based on one or more metrics, which may relate to network performance, UE performance, etc.

In one design, downlink carriers may be assigned to eNBs based on a predetermined schedule. The schedule may indicate the number of downlink carriers to assigned to different eNBs and when the assigned downlink carriers are valid. The schedule may be generated by a network operator to obtain good performance. For example, four downlink carriers may be available, three downlink carriers may be assigned to macro eNBs during the day, and three downlink carriers may be assigned to femto eNBs at night when more people are at home and expected to use their femto eNBs.

In another design, eNBs may communicate with one another to assign downlink carriers among these eNBs. For example, a macro eNB (or a network entity) may obtain the loading of neighbor eNBs and may assign downlink carriers to itself and the neighbor eNBs such that good performance can be achieved.

In one design, one downlink carrier may be designated as a downlink anchor carrier for an eNB. The downlink anchor carrier may have one or more of the following attributes:
  Can be transmitted at full power by the eNB,
  Has low interference from other eNBs,
  Carry synchronization signals used for acquisition,
  Carry control information for data transmission on the anchor carrier and/or other carriers,
  Support communication for UEs capable of operating on a single carrier, and
  May be a preferred downlink carrier for operation.

In one design, one uplink carrier may be designated as an uplink anchor carrier for the eNB. The uplink anchor carrier may have one or more of the following attributes:
  Has low interference from other UEs served by other eNBs,
  Carry control information for data transmission on the anchor carrier and/or other carriers,
  Support communication for UEs capable of operating on a single carrier, and
  May be a preferred uplink carrier for operation.

In one design, the downlink anchor carrier and/or the uplink anchor carrier may be specific for the eNB and may be applicable for all UEs served by the eNB. In another design, the downlink anchor carrier and/or the uplink anchor carrier may be specific for a UE, and different UEs may have different downlink anchor carriers and/or different uplink anchor carriers.

In one design, unrestricted eNBs may transmit synchronization signals (e.g., the PSS and SSS) on each of the available downlink carriers. Restricted eNBs may transmit synchronization signals on each assigned downlink carrier. Macro eNBs may use lower power when transmitting synchronization signals on unassigned downlink carriers. UEs may detect for eNBs based on the synchronization signals transmitted by these eNBs. The UEs may be able to detect the synchronization signals from both macro eNBs and restricted eNBs on the downlink carriers assigned to the restricted eNBs since the macro eNBs transmit at a lower power level on these carriers. The UEs may also determine received signal quality, pathloss, and/or other metrics based on the synchronization signals. Serving eNBs may be selected for the UEs based on the metric(s).

An eNB may have one or more assigned downlink carriers and one or more unassigned downlink carriers. The eNB may serve one or more UEs on each assigned downlink carrier and may also serve zero or more UEs on each unassigned downlink carrier. For example, the eNB may serve strong UEs (e.g., UEs with lower pathloss) on the unassigned downlink carriers since these UE may be able to overcome high interference from other eNBs. The eNB may serve weak UEs (e.g., UEs with higher pathloss) on the assigned downlink carriers so that these UE can observe less interference from other eNBs.

The eNB may transmit data and control information on the assigned and unassigned downlink carriers in various manners. The control information may comprise scheduling grants, ACK information, etc. In one design, the eNB may transmit data and control information for each UE on the same downlink carrier. This design may simplify operation since data and control information are sent on the same carrier. In another design, the eNB may transmit data and control information for a given UE on different downlink carriers. For example, the eNB may transmit control information on an assigned downlink carrier and may transmit data on an unassigned downlink carrier to the UE. This design may improve performance since the eNB can transmit the control information at higher power on the assigned downlink carrier. In one design, a new PDCCH format may be used to convey scheduling grants for data transmission on multiple downlink carriers. The scheduling grants for different downlink carriers may be sent in different payload and/or with different scrambling on the PDCCH. The PHICH may carry ACK information for data transmission on multiple uplink carriers.

In one design, frequency reservation may be used to improve performance and may also be referred to as intra-carrier bandwidth partitioning. An eNB may be assigned a downlink carrier and may reserve a portion of the assigned downlink carrier for another eNB. For example, the eNB may be assigned a 5 MHz carrier with four subbands. The eNB may reserve one or more subbands in the assigned downlink carrier for another eNB. The eNB may transmit the PSS, SSS, PBCH and a cell-specific reference signal for each cell on the assigned downlink carrier in the normal manner. The eNB may also transmit control information and data on the portion of the assigned downlink carrier that is not reserved for another eNB. The eNB may avoid transmitting, or may transmit at a lower power level, on the reserved portion of the assigned downlink carrier.

Frequency reservation may be used to dynamically re-allocate frequency resources among eNBs. Frequency reservation may be used when and as needed. For example, the number of subbands to reserve for another eNB may be dependent on the amount of data to send by the other eNB. The subbands may also be reserved for as long as needed by the other eNB. Frequency reservation may also be used to assign frequency resources with granularity smaller than one carrier.

An eNB may broadcast bar information indicating the status of different downlink carriers. In one design, the bar information for a downlink carrier may indicate whether that carrier is available for use by UEs. For example, the bar information for each assigned downlink carrier may indicate that the carrier is available for use, and the bar information for each unassigned downlink carrier may indicate that the carrier is unavailable for use. A UE detecting a downlink carrier being barred by the eNB may (i) search for another downlink carrier that is not barred by the eNB or (ii) select another eNB on that downlink carrier.

In another design, the bar information for a downlink carrier may identify UEs allowed to access the carrier and/or UEs not allowed to access the carrier. For example, the bar information for an unassigned downlink carrier may bar a first set of UEs from accessing the carrier and may allow a second set of UEs to access the carrier. The first set of UEs may be unable to reliably communicate with the eNB on the unassigned downlink carrier at lower transmit power level and may then (i) search for another downlink carrier assigned to the eNB or (ii) select another eNB assigned this downlink carrier. The second set of UEs may be able to reliably communicate with the eNB on the unassigned downlink carrier even at the lower transmit power level.

The various designs and features described above for downlink carriers may also be used for uplink carriers. In general, any number of uplink carriers may be available for the uplink. The number of uplink carriers may be dependent on various factors such as the system bandwidth, the desired or required bandwidth for each uplink carrier, etc. The available uplink carriers may be assigned to eNBs, e.g., as described above for the downlink carriers. Higher (e.g., full) transmit power may be used for each assigned uplink carrier, and lower (or zero) transmit power may be used for each unassigned uplink carrier.

A given eNB may serve one or more UEs on each assigned uplink carrier and may also serve zero or more UEs on each unassigned uplink carrier. In one design, a UE may transmit data and control information on the same carrier to the eNB. This design may simplify operation. In another design, a UE may transmit data on an assigned or unassigned uplink carrier and may transmit control information on an assigned uplink carrier to the eNB. This design may improve reliability for the control information, which may observe less interference on the assigned uplink carrier from other UEs communicating with other eNBs.

In one design, frequency reservation may be used to reserve a portion of an uplink carrier assigned to an eNB for use by another eNB. Frequency reservation may be used when and as needed and may be triggered by signaling exchanged via the backhaul, as described above.

Figure 5:
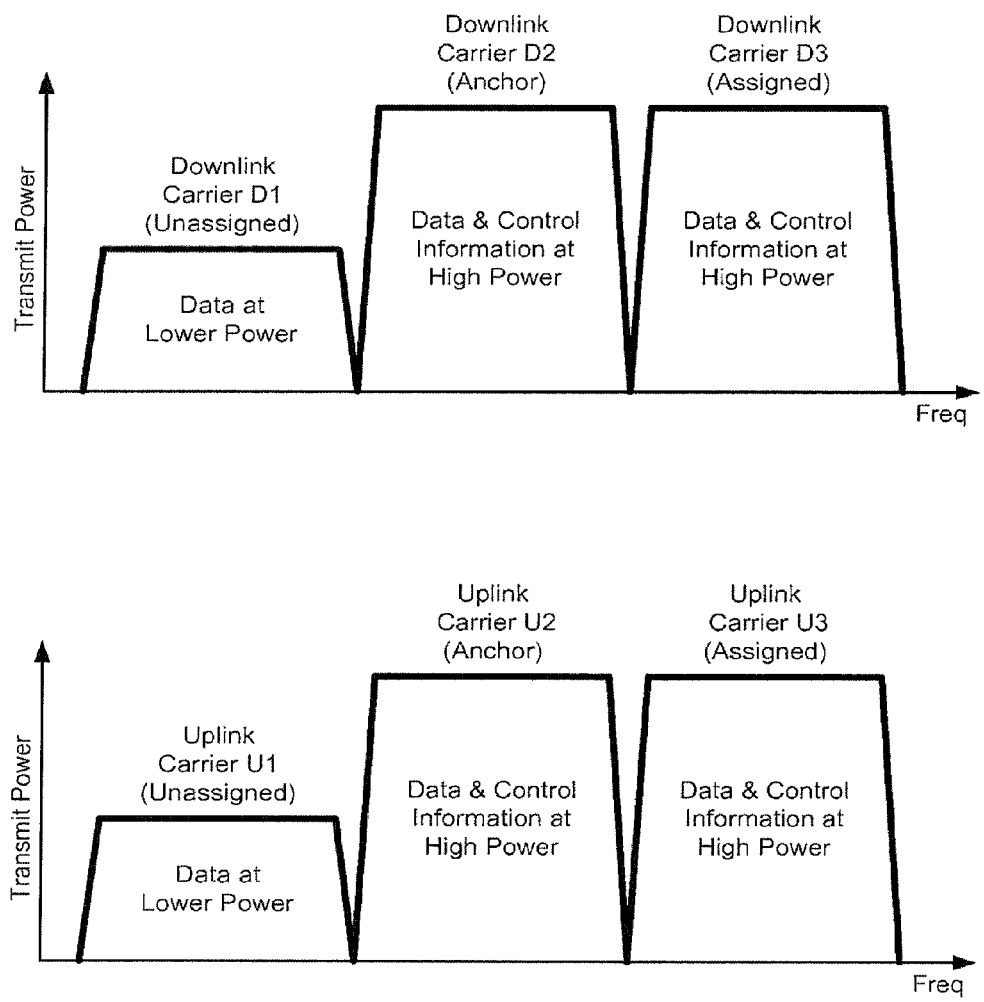
FIG. 5 shows communication on multiple downlink and uplink carriers.

FIG. 5 shows a design of communication by an eNB. In the example shown in FIG. 5, three downlink carriers D1, D2 and D3 are available on the downlink, and three uplink carriers U1, U2 and U3 are available for the uplink. The eNB may be assigned downlink carriers D2 and D3 as well as uplink carriers U2 and U3.

In one design, the eNB may have a downlink anchor carrier and an uplink anchor carrier. The downlink anchor carrier may be one of the assigned downlink carriers, e.g., downlink carrier D2. The uplink anchor carrier may be one of the assigned uplink carriers, e.g., uplink carrier U2. The downlink anchor carrier may carry downlink control information from the eNB to support data transmission on the downlink and uplink on all carriers. The uplink anchor carrier may carry uplink control information from the UEs to support data transmission on the downlink and uplink on all carriers. For example, the downlink control information may include downlink grants for data transmission on the downlink, uplink grants for data transmission on the uplink, ACK information for data transmission on the uplink, etc. The uplink control information may include resource requests for data transmission on the uplink, CQI information for data transmission on the downlink, ACK information for data transmission on the downlink, etc. The eNB may transmit data to the UEs on the downlink anchor carrier as well as other downlink carriers, e.g., subject to the lower transmit power limitation for the unassigned downlink carrier. The UEs may transmit data to the eNB on the uplink anchor carrier as well as other uplink carriers, e.g., subject to the lower transmit power limitation for unassigned uplink carrier.

In another aspect, a station may perform auto-configuration to select a suitable carrier for communication from among multiple carriers. The station may be a UE or a network entity, which may be a base station, a network controller, etc.

In one design, the station may determine a metric for each carrier available for communication. The metric may comprise received signal quality, pathloss, signal strength, and/or other parameters. The metric may also comprise a transmit energy metric, an effective geometry metric, a projected data rate metric, a utility metric, or some other metric computed based on the at least one parameter.

The station may select a carrier for communication from among the multiple carriers based on the metric for each carrier. In one design, the metric may comprise received signal quality, and the station may select the carrier with the highest received signal quality for communication. In another design, the metric may comprise pathloss, and the station may select the carrier with the lowest pathloss for communication. In yet another design, the metric may comprise loading, and the station may select the carrier with the least loading for communication. In yet another design, the metric may comprise access quality determined based on quality-of-service (QoS) and/or data rate, and the station may select the carrier with the highest access quality for communication. The station may also select a carrier for communication in other manners.

The metric for each carrier may be determined based on information that may be obtained in different manners, e.g., depending on whether the station is a UE or a network entity. In one design, the metric for each carrier may be determined based on over-the-air measurements, which may be used to determine received signal quality, pathloss, etc. In another design, the metric for each carrier may be determined based on reports sent by UEs to a network entity. In yet another design, the metric for each carrier may be determined based on backhaul information received by the network entity from at least one base station.

Anchor carriers may be used to facilitate communication, as described above. Anchor carriers may also be used to mitigate self-desensitization. If a wireless network uses a number of carriers on the downlink and uplink, then self-desensitization at a UE may occur, and downlink carriers closest to uplink transmission may suffer from interference due to limited isolation between a transmit port and a receive port of a duplexer at the UE. To mitigate self-desensitization, uplink and downlink control may be sent on carriers that may be farthest from each other. The uplink and downlink transmissions may be from different radio technologies.

FIG. 6 shows a design of a process 600 for communication by a first base station in a wireless network. The first base station may communicate on a first carrier at a first (e.g., full) transmit power level (block 612). The first base station may communicate on a second carrier at a second transmit power level, which may be lower than the first transmit power level to reduce interference to a second base station communicating on the second carrier (block 614). The first carrier may have less interference from the second base station than the second carrier.

The first and second base stations may belong in different power classes or may support different association/access types. In one design, the first base station may belong in a high power class whereas the second base station may belong in a lower power class, or vice versa. In another design, the first base station may support unrestricted access whereas the second base station may support restricted access, or vice versa.

In one design, the first and second carriers may be for the downlink. For block 612, the first base station may send a first data transmission on the first carrier at the first transmit power level to a first UE. For block 614, the first base station may send a second data transmission on the second carrier at the second transmit power level to a second UE. In one design, the first base station may send control information to the first and second UEs on the first carrier, which may be a downlink anchor carrier. In another design, the first base station may send control information to the first UE on the first carrier and may send control information to the second UE on the second carrier. The first base station may also send at least one synchronization signal on each of the first and second carriers to allow UEs to detect the first base station.

In another design, the first and second carriers may be for the uplink. For block 612, the first base station may receive a first data transmission sent by a first UE on the first carrier at the first transmit power level. For block 614, the first base station may receive a second data transmission sent by a second UE on the second carrier at the second transmit power level. In one design, the first base station may receive control information from the first and second UEs on the first carrier, which may be an uplink anchor carrier. In another design, the first base station may receive control information from the first UE on the first carrier and may receive control information from the second UE on the second carrier.

In one design, the first and second carriers may be assigned to the first and second base stations based on a static or semi-static schedule. In another design, the first base station may exchange signaling with the second base station or a network entity to determine the use of the first and/or second carrier by each base station. For example, the first base station may determine whether to reduce transmit power on the second carrier based on capacity benefit to the second base station or the wireless network.

In one design, the first base station may reserve a portion of the first carrier for use by the second base station. The first base station may use the remaining portion of the first carrier for communication. In another design, the first base station may determine a portion of the second carrier reserved by the second base station for the first base station. The first base station may then communicate on the reserved portion of the second carrier at the first transmit power level.

In one design, the first base station may identify at least one UE accessing the base station via the first carrier and observing less interference on the second carrier. The first base station may direct the identified UE(s) to the second carrier in order to balance load across carriers.

In one design, the first base station may broadcast (i) bar information indicating that the first carrier is not barred from use and (ii) bar information indicating that the second carrier is barred from use. In another design, the first base station may broadcast bar information indicating that the second carrier is barred from use by a first set of UEs and not barred from use by a second set of UEs. The first base station may also broadcast other bar information for the first and/or second carrier.

In one design, the first base station may communicate on (i) a third carrier at a third transmit power level and (ii) a fourth carrier at a fourth transmit power level lower than the third transmit power level to reduce interference on the fourth carrier. The first and second carriers may be used for communication on one link (e.g., the downlink), and the third and fourth carriers may be used for communication on the other link (e.g., the uplink).

FIG. 7 shows a design of an apparatus 700 for communicating in a wireless network. Apparatus 700 includes a module 712 to communicate on a first carrier at a first transmit power level by a first base station, and a module 714 to communicate on a second carrier at a second transmit power level by the first base station, the second transmit power level being lower than the first transmit power level.

FIG. 8 shows a design of a process 800 for communication by a second base station in a wireless network. The second base station may determine a carrier having less interference from a first base station among multiple carriers available for communication (block 812). The second base station may determine the interference on each of the multiple carriers based on over-the-air measurements from UEs, signaling from the first base station, etc. The second base station may communicate on the carrier (block 814). The first and second base stations may belong in different power classes or may support different association types.

FIG. 9 shows a design of an apparatus 900 for communicating in a wireless network. Apparatus 900 includes a module 912 to determine a carrier having less interference from a first base station among multiple carriers available for communication, and a module 914 to communicate on the carrier by a second base station, the first and second base stations belonging in different power classes or supporting different association types.

Figure 10:
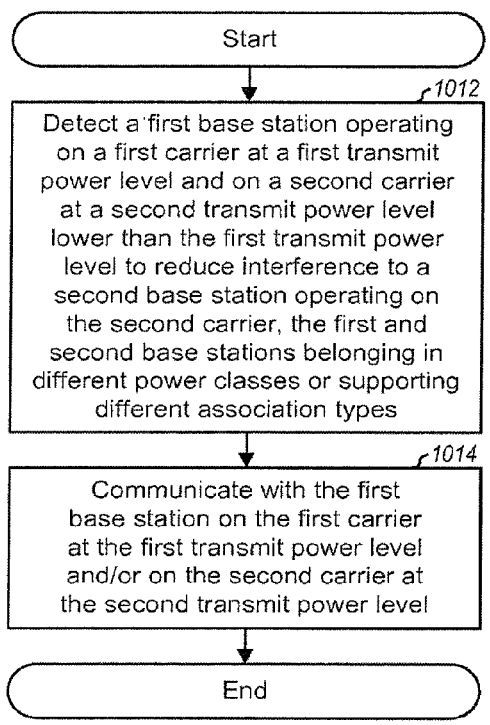
FIGS. 10 and 11 show a process and an apparatus, respectively, for communication by a UE.

FIG. 10 shows a design of a process 1000 for communication by a UE in a wireless network. The UE may detect a first base station operating on a first carrier at a first transmit power level and on a second carrier at a second transmit power level (block 1012). The second transmit power level may be lower than the first transmit power level to reduce interference to a second base station operating on the second carrier. The first and second base stations may belong in different power classes or may support different association types. The UE may communicate with the first base station on the first carrier at the first transmit power level and/or on the second carrier at the second transmit power level (block 1014).

In one design of block 1012, the UE may receive signals (e.g., synchronization signals) on the first and/or second carrier from multiple base stations including the first base station. The UE may select the first base station for communication from among the multiple base stations based on the received signals. For example, the UE may select the first base station based on received signal quality, pathloss, etc.

The UE may select the first or second carrier for communication with the first base station. In one design, the UE may determine received signal quality of each of the first and second carriers. The UE may select the first or second carrier having higher received signal quality for communication. In another design, the UE may select the first carrier if interference on the second carrier is above a threshold. The UE may select the second carrier if the interference on this carrier is below the threshold. The UE may also select the first or second carrier in other manners.

The UE may communicate with the first base station on the selected carrier. In one design, the UE may exchange (e.g., receive or send) data and control information on the selected carrier with the first base station. In another design, the UE may exchange control information on the first carrier and may exchange data on the selected carrier from the first base station.

Figure 11:
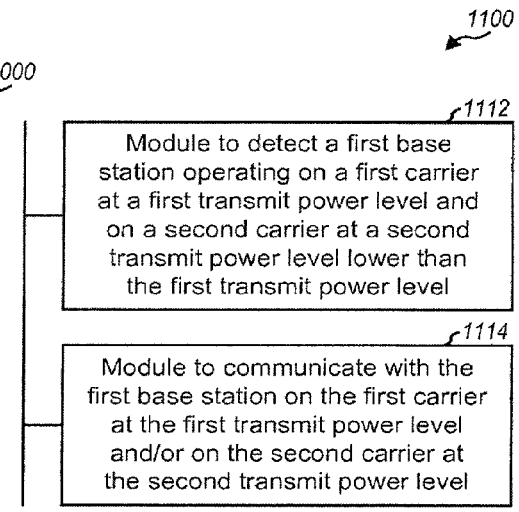

FIG. 11 shows a design of an apparatus 1100 for communication in a wireless network. Apparatus 1100 includes a module 1112 to detect a first base station operating on a first carrier at a first transmit power level and on a second carrier at a second transmit power level lower than the first transmit power level, and a module 1114 to communicate with the first base station on the first carrier at the first transmit power level and/or on the second carrier at the second transmit power level.

Figure 12:
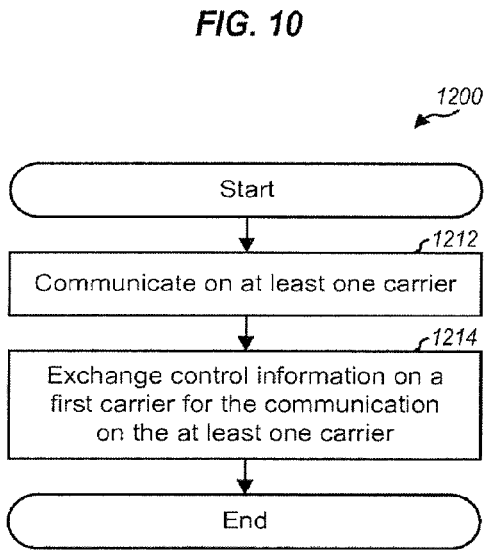
FIGS. 12 and 13 show a process and an apparatus, respectively, for communication on multiple carriers with control information sent on a single carrier.

FIG. 12 shows a design of a process 1200 for communication on at least one carrier with control information being sent on a designated carrier different from the at least one carrier. Process 1200 may be performed by a station, which may be a base station, a UE, or some other entity. The station may communicate on at least one carrier (block 1212). The station may exchange control information on a first carrier for the communication on the at least one carrier (block 1214). The first carrier may be different from the at least one carrier. The control information may comprise scheduling grants, CQI information, ACK information, and/or other information for data transmissions on the at least one carrier.

The station may be a base station. In one design, the at least one carrier and the first carrier may be for the downlink. The base station may send at least one data transmission to at least one UE on the at least one carrier and may send control information (e.g., scheduling grants, etc.) to the at least one UE on the first carrier. In another design, the at least one carrier and the first carrier may be for the uplink. The base station may receive at least one data transmission from at least one UE on the at least one carrier and may receive control information (e.g., resource requests, ACK information, etc.) from the at least one UE on the first carrier.

The station may be a UE. In one design, the at least one carrier and the first carrier may be for the downlink. The UE may receive a data transmission from a base station on the at least one carrier and may receive control information (e.g., scheduling grants, etc.) from the base station on the first carrier. In another design, the at least one carrier and the first carrier may be for the uplink. The UE may send a data transmission to a base station on at least one of the at least one carrier and may send control information (e.g., resource requests, ACK information, etc.) to the base station on the first carrier.

Figure 13:
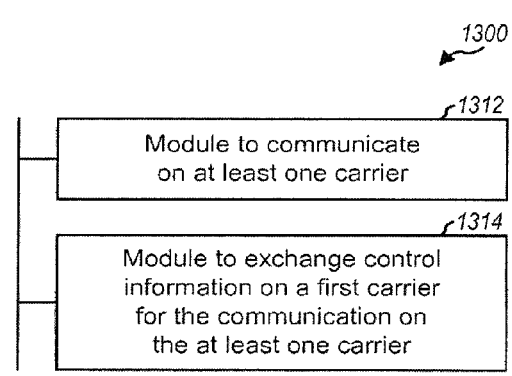

FIG. 13 shows a design of an apparatus 1300 for communication in a wireless network. Apparatus 1300 includes a module 1312 to communicate on at least one carrier, and a module 1314 to exchange control information on a first carrier for the communication on the at least one carrier, with the first carrier being different from the at least one carrier.

FIG. 14 shows a design of a process 1400 for communication on a carrier with auto-configuration. Process 1400 may be performed by a station, which may be a UE or a network entity. The network entity may be a base station, a network controller, or some other entity. The station may determine a metric for each of multiple carriers available for communication (block 1412). The metric may comprise at least one parameter other than signal strength, such as received signal quality, pathloss, etc. The station may select a carrier for communication from among the multiple carriers based on the metric for each carrier, e.g., as described above (block 1414). The station may communicate on the selected carrier (block 1416). In one design, both data and control information may be exchanged (e.g., sent or received) via the selected carrier. In another design, control information may be exchanged via the selected carrier, and data may be exchanged via the selected carrier and/or another carrier. The selected carrier may be designated as an anchor carrier for the station and may have the attributes described above for the anchor carrier.

FIG. 15 shows a design of an apparatus 1500 for communication in a wireless network. Apparatus 1500 includes a module 1512 to determine a metric for each of multiple carriers available for communication, the metric comprising at least one parameter other than signal strength, a module 1514 to select a carrier for communication from among the multiple carriers based on the metric for each carrier, and a module 1516 to communicate on the selected carrier.

FIG. 16 shows a design of a process 1600 for broadcasting bar information by a base station in a wireless network. The base station may determine bar information for at least one carrier (block 1612). The bar information for each carrier may indicate whether the carrier is barred from use. The base station may broadcast the bar information to UEs, which may use the bar information to determine access to the base station (block 1614).

In one design, the at least one carrier may comprise first and second carriers. The bar information for the first carrier may indicate that the first carrier is barred, and the bar information for the second carrier may indicate that the second carrier is not barred. For example, the base station may be able to use full transmit power on the second carrier and a lower transmit power level on the first carrier. The bar information may be used to direct UEs to access the base station via the second carrier. The base station may then redirect one or more UEs to the first carrier, if appropriate.

In another design, the bar information for a given carrier may indicate that the carrier is not barred for a first set of UEs and is barred for a second set of UEs. For example, the base station may be able to use a lower transmit power level on the carrier. The first set of UEs may be UEs that can achieve satisfactory performance with the lower transmit power level. The second set of UEs may be UEs that require a higher transmit power level in order to achieve satisfactory performance. As another example, the first set of UEs may be capable of operating on multiple carriers. These UEs may receive data on the carrier at a lower transmit power level and may receive control information on another carrier at a higher transmit power level. The bar information for each carrier may also comprise other information that may be use to control access and communication on the carrier.

FIG. 17 shows a design of an apparatus 1700 for communication in a wireless network. Apparatus 1700 includes a module 1712 to determine bar information for at least one carrier, the bar information for each carrier indicating whether the carrier is barred from use, and a module 1714 to broadcast the bar information to UEs.

The modules in FIGS. 7, 9, 11, 13, 15 and 17 may comprise processors, electronics devices, hardware devices, electronics components, logical circuits, memories, software codes, firmware codes, etc., or any combination thereof For clarity, much of FIGS. 6 through 17 has been described for two carriers. In general, the techniques may be applied to any number of carriers in an analogous manner.

Figure 18:
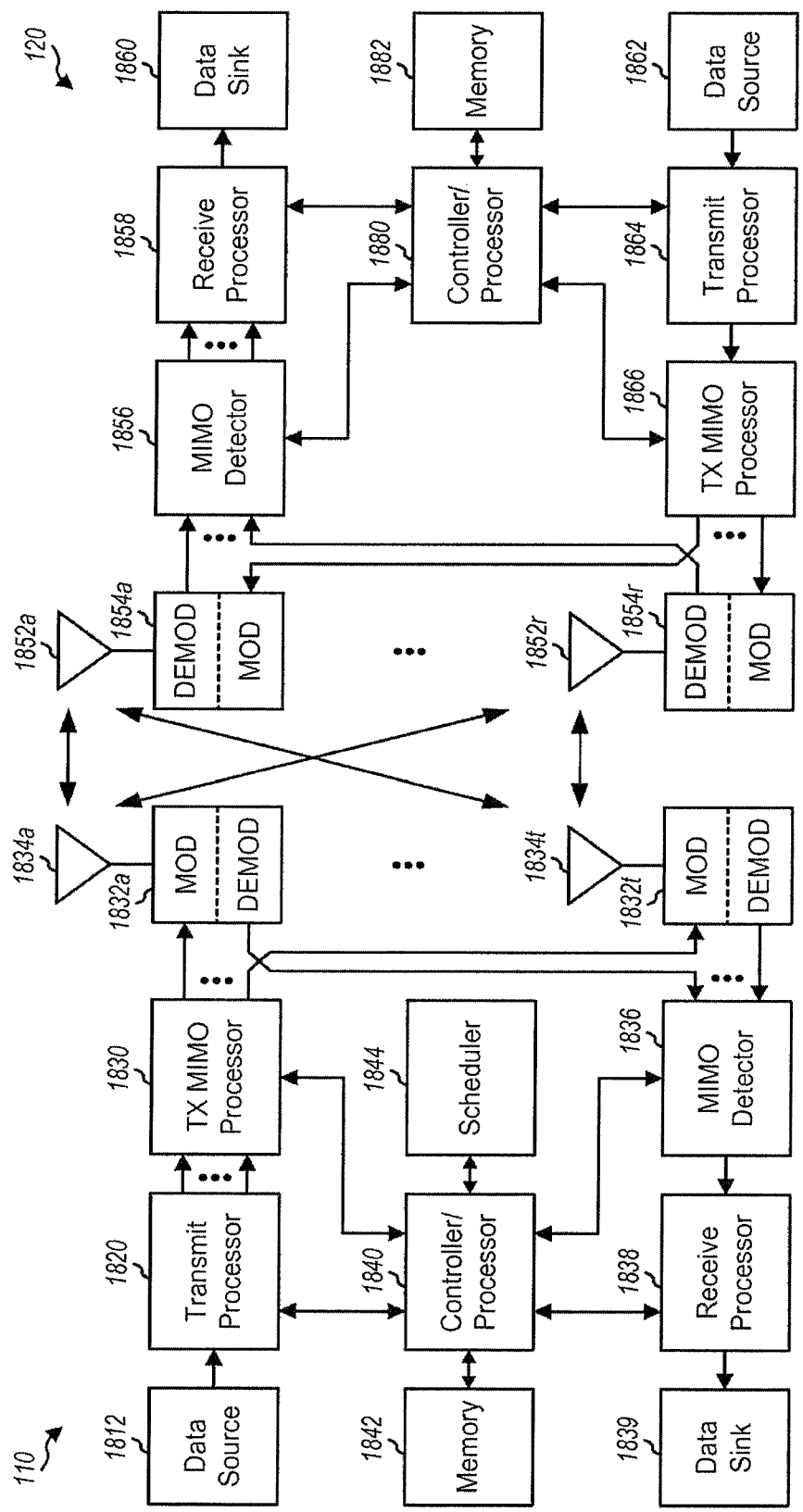
FIG. 18 shows a block diagram of a base station and a UE.

FIG. 18 shows a block diagram of a design of a base station/eNB 110 and a UE 120, which may be one of the base stations/eNBs and one of the UEs in FIG. 1. Base station 110 may be equipped with T antennas 1834a through 1834t, and UE 120 may be equipped with R antennas 1852a through 1852r, where in general T≥1 and R≥1.

At base station 110, a transmit processor 1820 may receive data from a data source 1812 and control information from a controller/processor 1840. Processor 1820 may process (e.g., encode and symbol map) the data and control information to obtain data symbols and control symbols, respectively. Processor 1820 may also generate reference symbols, e.g., for synchronization signals and reference signals. A transmit (TX) multiple-input multiple-output (MIMO) processor 1830 may perform spatial processing (e.g., precoding) on the data symbols, the control symbols, and/or the reference symbols, if applicable, and may provide T output symbol streams to T modulators (MODs) 1832a through 1832t. Each modulator 1832 may process a respective output symbol stream (e.g., for OFDM, etc.) to obtain an output sample stream. Each modulator 1832 may further process (e.g., convert to analog, amplify, filter, and upconvert) the output sample stream to obtain a downlink signal. T downlink signals from modulators 1832a through 1832t may be transmitted via T antennas 1834a through 1834t, respectively.

At UE 120, antennas 1852a through 1852r may receive the downlink signals from base station 110 and may provide received signals to demodulators (DEMODs) 1854a through 1854r, respectively. Each demodulator 1854 may condition (e.g., filter, amplify, downconvert, and digitize) a respective received signal to obtain input samples. Each demodulator 1854 may further process the input samples (e.g., for OFDM, etc.) to obtain received symbols. A MIMO detector 1856 may obtain received symbols from all R demodulators 1854a through 1854r, perform MIMO detection on the received symbols if applicable, and provide detected symbols. A receive processor 1858 may process (e.g., demodulate, deinterleave, and decode) the detected symbols, provide decoded data for UE 120 to a data sink 1860, and provide decoded control information to a controller/processor 1880.

On the uplink, at UE 120, a transmit processor 1864 may receive and process data from a data source 1862 and control information from controller/processor 1880. Processor 1864 may also generate reference symbols for a reference signal. The symbols from transmit processor 1864 may be precoded by a TX MIMO processor 1866 if applicable, further processed by modulators 1854a through 1854r (e.g., for SC-FDM, etc.), and transmitted to base station 110. At base station 110, the uplink signals from UE 120 may be received by antennas 1834, processed by demodulators 1832, detected by a MIMO detector 1836 if applicable, and further processed by a receive processor 1838 to obtain decoded data and control information sent by UE 120. Processor 1838 may provide the decoded data to a data sink 1839 and the decoded control information to controller/processor 1840.

Controllers/processors 1840 and 1880 may direct the operation at base station 110 and UE 120, respectively. Processor 1840 and/or other processors and modules at base station 110 may perform or direct process 600 in FIG. 6, process 800 in FIG. 8, process 1200 in FIG. 12, process 1400 in FIG. 14, process 1600 in FIG. 16, and/or other processes for the techniques described herein. Processor 1880 and/or other processors and modules at UE 120 may perform or direct process 1000 in FIG. 10, process 1200 in FIG. 12, process 1400 in FIG. 14, and/or other processes for the techniques described herein. Memories 1842 and 1882 may store data and program codes for base station 110 and UE 120, respectively. A scheduler 1844 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of communicating in a wireless communication network, comprising:
    identifying, by a user equipment (UE), a carrier for communication from among multiple carriers available for communication based on a metric for each of the multiple carriers, the metric comprising at least one parameter other than signal strength;
    communicating on the identified carrier, wherein the communicating on the identified carrier comprises designating the identified carrier as an anchor carrier, and transmitting control information via the identified carrier at a first transmit power, wherein the anchor carrier is designated to be separated from a downlink carrier, on which the HE receives downlink control information transmissions, by at least one carrier and two guard bands, to mitigate self-desensitization; and
    communicating on a second carrier of the multiple carriers, wherein the communicating on the second carrier comprises sending data transmissions via the second carrier at a second transmit power lower than the first transmit power.

2. The method of claim 1, wherein the metric comprises received signal quality, and wherein the identifying a carrier for communication comprises identifying a carrier with highest received signal quality for communication.

3. The method of claim 1, wherein the metric comprises pathloss, and wherein the identifying a carrier for communication comprises identifying a carrier with lowest pathloss for communication.

4. The method of claim 1, wherein the metric comprises loading, and wherein the identifying a carrier for communication comprises identifying a carrier with least loading for communication.

5. The method of claim 1, wherein the metric comprises access quality determined based on quality-of-service (QoS), or data rate, or both, and wherein the identifying a carrier for communication comprises identifying a carrier with highest access quality for communication.

6. The method of claim 1, wherein the designating the identified carrier as the anchor carrier comprises designating the identified carrier as an anchor carrier specific for the UE.

7. The method of claim 1, wherein the determining a metric, the identifying a carrier for communication, and the communicating on the identified carrier are performed by the UE.

8. The method of claim 1, further comprising determining the metric for each of the multiple carrier based on over-the-air measurements.

9. An apparatus for wireless communication, comprising:
    means for identifying, by a user equipment (UE), a carrier for communication from among multiple carriers available for communication based on a metric for each of the multiple carriers, the metric comprising at least one parameter other than signal strength;
    means for communicating on the identified carrier, wherein the means for communicating on the identified carrier comprises means for designating the identified carrier as an anchor carrier, and means for transmitting control information via the identified carrier at a first transmit power, wherein the anchor carrier is designated to be separated from a downlink carrier, on which the UE receives downlink control information transmissions, by at least one carrier and two guard bands, to mitigate self-desensitization; and
    means for communicating on a second carrier of the multiple carriers, wherein the means for communicating on the second carrier comprises means for sending data transmissions via the second carrier at a second transmit power lower than the first transmit power.

10. The apparatus of claim 9, wherein the means for designating the identified carrier as the anchor carrier comprises means for designating the identified carrier as an anchor carrier specific for the UE.

11. The apparatus of claim 9, wherein the metric comprises received signal quality, and wherein the means for identifying a carrier for communication comprises means for identifying a carrier with highest received signal quality for communication.

12. The apparatus of claim 9, wherein the metric comprises pathloss, and wherein the means for identifying a carrier for communication comprises means for identifying a carrier with lowest pathloss for communication.

13. The apparatus of claim 9, wherein the metric comprises loading, and wherein the means for identifying a earlier for communication comprises means for identifying a carrier with least loading for communication.

14. The apparatus of claim 9, wherein the metric comprises access quality determined based on quality-of-service (QoS), or data rate, or both, and wherein the means for identifying a carrier for communication comprises means for identifying a carrier with highest access quality for communication.

15. The apparatus of claim 9, further comprising means for determining the metric for each of the multiple carrier based on over-the-air measurements.

16. An apparatus for wireless communication, comprising:
  at least one processor; and
  a memory coupled to the at least one processor, wherein the at least one processor is configured to:
  identify, by a user equipment (UE), a carrier for communication from among multiple carriers available for communication based on a metric for each of the multiple carriers, the metric comprising at least one parameter other than signal strength;
  communicate on the identified carrier; and
  communicate on a second carrier of the multiple carriers,
  wherein the configuration of the at least one processor to communicate on the identified carrier comprises configuration to designate the identified carrier as an anchor carrier, and configuration to transmit control information via the identified carrier, wherein the anchor carrier is designated to be separated from a downlink carrier, on which the UE receives downlink control information transmissions, by at least one carrier and two guard bands, to mitigate self-desensitization, and
  wherein the configuration of the at least processor to communicate on the second carrier comprises configuration to send data transmissions via the second carrier at a second transmit power lower than the first transmit power.

17. The apparatus of claim 16, wherein the configuration to designate the identified carrier as the anchor carrier comprises configuration to designate the identified carrier as an anchor carrier specific for the UE.

18. The apparatus of claim 16, wherein the metric comprises one of: received signal quality, pathloss, loading, or a combination thereof, and wherein the configuration of the at least one processor to identify a carrier for communication comprises configuration to identify a carrier with highest received signal quality for communication, lowest pathloss for communication, or least loading for communication.

19. The apparatus of claim 16, wherein the metric comprises access quality determined based on quality-of-service (QoS), or data rate, or both, and wherein the configuration of the at least one processor to identify a carrier for communication comprises configuration to identify a carrier with highest access quality for communication.

20. The apparatus of claim 16, wherein the at least one processor is further configured to determine the metric for each of the multiple carrier based on over-the-air measurements.

21. A non-transitory computer-readable medium comprising:
  code for identifying, by a user equipment (UE), a carrier for communication from among multiple carriers available for communication based on a metric for each of the multiple carriers, the metric comprising at least one parameter other than signal strength;
  code for communicating on the identified carrier, wherein the code for communicating on the identified carrier comprises code for designating the identified carrier as an anchor carrier, and code for transmitting control information via the identified carrier at a first transmit power, wherein the anchor carrier is designated to be separated from a downlink carrier, on which the UE receives downlink control information transmissions, by at least one carrier and two guard bands; to mitigate self-desensitization; and
  code for communicating on a second carrier of the multiple carrier, wherein the code for communicating on the second carrier comprises code for sending data transmissions via the second carrier at a second transmit power lower than the first transmit power.

22. The non-transitory computer-readable medium of claim 21, wherein the code for designating the identified carrier as the anchor carrier comprises code for designating the identified carrier as an anchor carrier specific for the UE.

23. The non-transitory computer-readable medium of claim 21, wherein the metric comprises one of: received signal quality, pathloss, loading, or a combination thereof and wherein the code for identifying a carrier for communication comprises code for identifying a carrier with highest received signal quality for communication lowest pathloss for communication, or least loading for communication.

24. The non-transitory computer-readable medium of claim 21, wherein the metric comprises access quality determined based on quality-of-service (QoS), or data rate, or both, and wherein the code for identifying a carrier for communication comprises code for identifying a carrier with highest access quality for communication.

25. The non-transitory computer-readable medium of claim 21, further comprising code for determining the metric for each of the multiple carrier based on over-the-air measurements.

26. A method of communicating in a wireless communication network, comprising:
  determining a metric for each of multiple carriers available for communication, the metric comprising at least one parameter other than signal strength;
  selecting a carrier for communication from among the multiple carriers based on the metric for each carrier;
  communicating on the selected carrier, wherein the communicating on the selected carrier comprises designating the selected carrier as an anchor carrier, and transmitting control information via the selected carrier at a first transmit power, wherein the anchor carrier is selected by a network entity and separated from an uplink carrier, on which the network entity receives uplink control information transmissions, by at least one carrier and two guard bands, to mitigate self-desensitization; and
  communicating on a second carrier of the multiple carriers, wherein the communicating on the second carrier comprises sending data transmissions via the second carrier at a second transmit power lower than the first transmit power.

27. The method of claim 26, wherein the designating the selected carrier as the anchor carrier comprises designating the selected carrier as an anchor carrier specific for the network entity.

28. The method of claim 26, wherein the metric comprises one of: received signal quality, pathloss, loading, or a combination thereof, and wherein the selecting a carrier for communication comprises selecting a carrier with highest received signal quality for communication, lowest pathloss for communication, or least loading for communication.

29. The method of claim 26, wherein the metric comprises access quality determined based on quality-of-service (QoS), or data rate, or both, and wherein the selecting a carrier for communication comprises selecting a carrier with highest access quality for communication.

30. The method of claim 26, wherein the determining a metric for each of the multiple carriers comprises determining the metric for each carrier based on one of: backhaul information received from at least one base station, reports sent by user equipments (UEs), or over-the-air measurements.

31. An apparatus for wireless communication, comprising:
   means for determining a metric for each of multiple carriers available for communication, the metric comprising at least one parameter other than signal strength;
   means for selecting a carrier for communication from among the multiple carriers based on the metric for each carrier;
   means for communicating on the selected carrier, wherein the means for communicating on the selected carrier comprises means for designating the selected carrier as an anchor carrier, and means for transmitting control information via the selected carrier at a first transmit power, wherein the anchor carrier is selected by a network entity and separated from an uplink carrier, on which the network entity receives uplink control information transmissions, by at least one carrier and two guard bands, to mitigate self-desensitization; and
   means for communicating on a second carrier of the multiple carriers, wherein the means for communicating on the second carrier comprises means for sending data transmissions via the second carrier at a second transmit power lower than the first transmit power.

32. The apparatus of claim 31, wherein the means for designating the selected carrier as the anchor carrier comprises means for designating the selected carrier as an anchor carrier specific for the network entity.

33. The apparatus of claim 31, wherein the metric comprises one of: received signal quality, pathloss, loading, or a combination thereof, and wherein the means for selecting a carrier for communication comprises means for selecting a carrier with highest received signal quality for communication, lowest pathloss for communication, or least loading for communication.

34. The apparatus of claim 31, wherein the metric comprises access quality determined based on quality-of-service (QoS), or data rate, or both, and wherein the means for selecting a carrier for communication comprises means for selecting a carrier with highest access quality for communication.

35. The apparatus of claim 31, wherein the means for determining a metric for each of the multiple carriers comprises means for determining the metric for each carrier based on one of: backhaul information received from at least one base station, reports sent by user equipments (UEs), or over-the-air measurements.

36. A non-transitory computer-readable medium comprising:
   code for determining a metric for each of multiple carriers available for communication, the metric comprising at least one parameter other than signal strength;
   code for selecting a carrier for communication from among the multiple carriers based on the metric for each carrier;
   code for communicating on the selected carrier, wherein the code for communicating on the selected carrier comprises code for designating the selected carrier as an anchor carrier, and code for transmitting control information via the selected carrier at a first transmit power, wherein the anchor carrier is selected by a network entity and separated from an uplink carrier, on which the network entity receives uplink control information transmissions, by at least one carrier and two guard bands, to mitigate self-desensitization; and
   code for communicating on a second carrier of the multiple carrier, wherein the code for communicating on the second carrier comprises code for sending data transmissions via the second carrier at a second transmit power lower than the first transmit power.

37. The non-transitory computer-readable medium of claim 36, wherein the code for designating the selected carrier as the anchor carrier comprises code for designating the selected carrier as an anchor carrier specific for the network entity.

38. The non-transitory computer-readable medium of claim 36, wherein the metric comprises one of: received signal quality, pathloss, loading, or a combination thereof, and wherein the code for selecting a carrier for communication comprises code for selecting a carrier with highest received signal quality for communication, lowest pathloss for communication, or least loading for communication.

39. The non-transitory computer-readable medium of claim 36, wherein the metric comprises access quality determined based on quality-of-service (QoS), or data rate, or both, and wherein the code for selecting a carrier for communication comprises code for selecting a carrier with highest access quality for communication.

40. The non-transitory computer-readable medium of claim 36, wherein the code for determining a metric for each of the multiple carriers comprises code for determining the metric for each carrier based on one of: backhaul information received from at least one base station, reports sent by user equipments (UEs), or-over-the-air measurements.

41. An apparatus for wireless communication, comprising:
   at least one processor; and
   a memory coupled to the at least one processor, wherein the at least one processor is configured to:
   determine a metric for each of multiple carriers available for communication, the metric comprising at least one parameter other than signal strength;
   select a carrier for communication from among the multiple carriers based on the metric for each carrier;
   communicate on the selected carrier; and
   communicate on a second carrier of the multiple carriers,
   wherein the configuration of the at least one processor to communicate on the selected carrier comprises configuration to designate the selected carrier as an anchor carrier, and configuration to transmit control information via the selected carrier, wherein the anchor carrier is selected by a network entity and separated from an uplink carrier, on which the network entity receives uplink control information transmissions, by at least one carrier and two guard bands, to mitigate self-desensitization, and
   wherein the configuration of the at least processor to communicate on the second carrier comprises configuration to send data transmissions via the second carrier at a second transmit power lower than the first transmit power.

42. The apparatus of claim 41, wherein the configuration of the at least one processor to designate the selected carrier as the anchor carrier comprises configuration to designate the selected carrier as an anchor carrier specific for the network entity.

43. The apparatus of claim 41, wherein the metric comprises one of: received signal quality, pathloss, loading, or a combination thereof, and wherein the configuration of the at least one processor to select a carrier for communication comprises configuration to select a carrier with highest received signal quality for communication, lowest pathloss for communication, or least loading for communication.

44. The apparatus of claim 41, wherein the metric comprises access quality determined based on quality-of-service (QoS), or data rate, or both, and wherein the configuration of the at least one processor to select a carrier for communication comprises configuration to select a carrier with highest access quality for communication.

45. The apparatus of claim 41, wherein the configuration of the at least one processor to determine a metric for each of the multiple carriers comprises configuration to determine the metric for each carrier based on one of: backhaul information received from at least one base station, reports sent by user equipments (UEs), or over-the-air measurements.

* * * * *